(12) United States Patent
Beauchamp et al.

(10) Patent No.: US 6,769,873 B2
(45) Date of Patent: Aug. 3, 2004

(54) DYNAMICALLY RECONFIGURABLE WIND TURBINE BLADE ASSEMBLY

(75) Inventors: Charles H. Beauchamp, Jamestown, RI (US); Stephen J. Plunkett, Middletown, RI (US); Stephen A. Huyer, Saunderstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 51 days.

(21) Appl. No.: 10/267,889

(22) Filed: Oct. 8, 2002

(65) Prior Publication Data

US 2004/0067134 A1 Apr. 8, 2004

(51) Int. Cl.[7] .................................................. F03D 7/04
(52) U.S. Cl. .............................. 416/3; 416/41; 416/240; 416/147; 415/15
(58) Field of Search ........................... 416/3, 40, 41, 416/240, 147, 155; 415/15

(56) References Cited

U.S. PATENT DOCUMENTS

| | | | | |
|---|---|---|---|---|
| 3,035,126 A | * | 5/1962 | Crownover | 310/333 |
| 3,930,626 A | * | 1/1976 | Croswell, Jr. | 416/240 |
| 4,047,832 A | * | 9/1977 | Sforza | 415/1 |
| 4,651,017 A | * | 3/1987 | Longrigg | 416/DIG. 4 |
| 4,700,081 A | * | 10/1987 | Kos et al. | 290/44 |
| 5,127,228 A | * | 7/1992 | Swenson | 60/527 |
| 5,289,041 A | * | 2/1994 | Holley | 290/44 |
| 5,626,312 A | * | 5/1997 | Head | 60/528 |
| 6,465,902 B1 | * | 10/2002 | Beauchamp et al. | 416/155 |

* cited by examiner

Primary Examiner—Edward K. Look
Assistant Examiner—Igor Kershteyn
(74) Attorney, Agent, or Firm—James M. Kasischke; Michael P. Stanley; Michael F. Oglo

(57) ABSTRACT

A dynamically reconfigurable wind turbine blade assembly includes a plurality of reconfigurable blades mounted on a hub, an actuator fixed to each of the blades and adapted to effect the reconfiguration thereof, and an actuator power regulator for regulating electrical power supplied to the actuators. A control computer accepts signals indicative of current wind conditions and blade configuration, and sends commands to the actuator power regulator. Sensors measure current wind conditions and current configurations and speed of the blades. An electrical generator supplies electrical power to the assembly. Data from the sensors is fed to the control computer which commands the actuator power regulator to energize the actuators to reconfigure the blades for optimum performance under current wind conditions.

5 Claims, 5 Drawing Sheets

DYNAMICALLY RECONFIGURABLE WIND TURBINE BLADE ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to wind turbines and is directed more particularly to a turbine blade assembly in which the turbine blades are reconfigured for maximum performance automatically in the course of operation of the turbine.

(2) Description of the Prior Art

Wind turbines are alternative energy sources with low environmental impact. The basic physical principle of wind turbine operation is to extract energy from the wind environment to rotate a mechanism to convert mechanical energy to electrical energy. In FIG. 1, there is shown a typical horizontal axis wind turbine. The turbine generally includes two or three blades 20 attached to a hub 22. Optimally, the blades 20 are lightweight but very stiff, to resist wind gusts. Many blades employ aerodynamic controls, such as ailerons or wind brakes, to control speed. The hub 22 is connected to a drive train (not shown) and is typically flexible to minimize structural loads. This mechanism is connected to an electrical generator 24. Wind turbines usually employ constant rotational speed generators, though advances are underway to utilize variable speed generators with efficient transformers. Variable speed generators have an advantage in that expensive gearboxes can be reduced or eliminated. The entire mechanism is elevated by a tower structure 26. The higher the tower, the stronger the wind, generally. A control room 28 usually is located near the turbine to monitor wind conditions and employ control strategies on the turbine.

Future applications envision wind turbines connected to a main power grid to provide energy to home and business users. At present, the cost of energy associated with wind turbines is significantly higher than the cost associated with non-renewable energy sources (coal or gas fired turbine generators, for example). The U.S. Department of Energy has a goal of substantially reducing the energy cost for sites where the average annual wind speed is about 15 mph. To do this, turbines must more efficiently generate power at lower wind speeds and must withstand excessive structural loading at high wind speeds. Wind turbines constructed based on current technology shut down at very low (below 6 mph) and very high (above 65 mph) wind speeds. This increases the cost of electricity.

The basis for electrical energy generation resides in the aerodynamics associated with a wind turbine. The turbine generates energy from lift produced on the blades in the presence of wind. FIG. 2A shows the effective lift and drag produced by a turbine blade 20 in operation. The two main sources of velocity the blade 20 "sees" are due to the rotation $r\omega$ of the rotor and the oncoming wind $V_w$. The angle $\beta$ is the physical angle of the blade either due to a pitch mechanism or due to the twist along the blade. The angle of attack $\alpha$ the blade 'sees' is therefore:

$$\alpha = \tan^{-1}(V_w/r\omega) - \beta \quad (1)$$

As wind speed increases, the angle of attack $\alpha$ on the blades increases. The blade pitch and twist is typically designed to optimize the angle of attack near the average wind speed. Thus, at low wind speeds the angle of attack is lower than optimum and the turbine loses efficiency. At very low speeds, there is insufficient energy available to drive the turbine. At high wind speeds the angle of attack of the blade becomes excessively large and can drive the blade into a stall. As a result, the forces and moments on the turbine blades become too high and the turbine is shut down to prevent blade failure caused by excessive dynamic loading.

The above applies specifically to the case in which the wind across the turbine rotor is uniform and perpendicular to the flow. During normal operating conditions, neither assumption is typically valid. The flow across the rotor is usually very non-uniform with horizontal and vertical wind shear components. In addition, much of the time, the flow into the rotor (FIG. 2B, for example) is offset by a certain yaw angle $\gamma$. Defining the position of the blade in the rotation cycle by $\Psi$, there is a normal $V_n$ and a crossflow $V_c$ component of the wind:

$$V_n = V_w \cos \gamma$$

$$V_c = -V_w \sin \gamma \quad (2)$$

The wind velocity is also modified due to horizontal and vertical wind shear at a given position in the angular rotation cycle:

$$V_w = V_{mean} + (r/R)[V_{vshear} \cos \Psi + V_{hshear} \sin \Psi] \quad (3)$$

The tangential velocity the blade experiences during the rotation cycle is then:

$$V_t = r\omega + V_c \cos \Psi \quad (4)$$

The instantaneous angle of attach of the blade during the rotation cycle is then:

$$\alpha = \tan^{-1}(V_n/V_t) - \beta \quad (5)$$

During uncontrolled turbine operation, there is significant variation in the local blade angle of attack. For large angle of attack variations, this can result in a phenomena termed "dynamic stall". Experimental field studies have demonstrated that significant dynamic loading can be experienced by the turbine blade resulting in fatigue and potential failure of the wind turbine. This problem is a major cause of increased operational and maintenance costs. An additional consequence is that for high wind speeds, the turbine is rarely operating under optimal conditions in terms of blade angle of attack. For both low and high wind speeds, it is desirable to control the local blade angle of attack to establish optimal operating conditions.

There are essentially two ways to control the blade angle of attack. The first is to vary the rotational velocity of the turbine. This is a major reason that research has been conducted to improve the efficiency of variable speed power transformers. During high wind speeds, it is desirable to increase the rotational velocity of the turbine, and decrease the rotational velocity during low wind speeds. Unfortunately, the efficiency of the transformers are such that it is still more cost effective to sacrifice operating the turbine during high wind states and maintain constant rotational velocity.

Accordingly, there is a need to provide an alternative wind turbine assembly which facilitates control of the angle of attack of the blades, as by actively or dynamically reconfiguring the blades to provide continuous adjustment of the angle of attack, as by local blade pitch angle adjustments and/or by pitching the entire blades.

SUMMARY OF THE INVENTION

An object of the invention is, therefore, to provide a wind turbine assembly adapted to twist the turbine blades dynamically to increase efficiency at low wind speeds, and reduce dynamic loads at high wind speeds.

A further object of the invention is to provide a wind turbine assembly having means to control the dynamics of the blade during instances of wind shear and non-zero yaw of the turbine with respect to the wind, such that optimal blade angles of attack can be maintained throughout the entire rotational cycle of the wind turbine.

A still further object of the invention is to provide a wind turbine assembly adapted to effect dynamic blade twist so that wind turbines will start at lower wind speeds, and continue to operate at higher wind speeds.

A still further object of the invention is to provide a wind turbine assembly adapted to adjust the twist of the wind turbine blades so as to increase the lift at low speeds and decrease the lift at high speeds, whereby to increase the range of wind speeds at which wind turbines can practically produce energy, and wherein at any specific wind speed the blades twist is optimized for that speed to improve the overall efficiency of the system.

With the above and other objects in view, a feature of the present invention is the provision of a dynamically reconfigurable wind turbine blade assembly comprising a plurality of reconfigurable twistable blades mounted on a hub, an actuator fixed to each of the blades and adapted to effect the reconfiguration thereof, and an actuator power regulator for regulating electrical power supplied to the actuators. A control computer accepts signals indicative of current wind conditions and blade configuration twist, and sends commands to the actuator power regulator. Sensors measure current wind conditions and current configurations and speed of the blades. An electrical generator supplies electrical power to the assembly. Data from the sensors is fed to the control computer which commands the actuator power regulator to energize the actuators to reconfigure the blades for optimum performance under current wind conditions.

In accordance with a further feature of the invention, there is provided a dynamically reconfigurable wind turbine blade assembly comprising a plurality of blades, each being reconfigurable while in operation to assume a selected configuration, an actuator embedded in each of the blades and adapted to receive electrical power to effect the blade reconfiguration to the selected configuration, and an actuator power regulator for regulating the electrical power supplied to the actuators. A control computer accepts signals indicative of current configuration of the blades, wind speed, rotational speed of the blades, and voltage and current available, and processes the signals, and sends commands to the actuator power regulator, and continuously adjusts the commands in response to the signals received. A blade load sensor is embedded in each of the blades and is adapted to measure deflection of the blade, and thereby the configuration of the blade, and to report to the control computer. Rotational speed sensors are embedded in a hub for the blades and are adapted to measure blade rotational speed and to report to the control computer. A wind speed sensor is disposed proximate a remainder of the assembly, and adapted to measure wind speed and to report to the control computer. An electrical generator supplies electrical power to the control computer and to the actuator power regulator. Data from the sensors is fed to the control computer which commands the actuator power regulator to initiate operation of the actuators to reconfigure the blades to obtain the selected configuration under current wind conditions.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
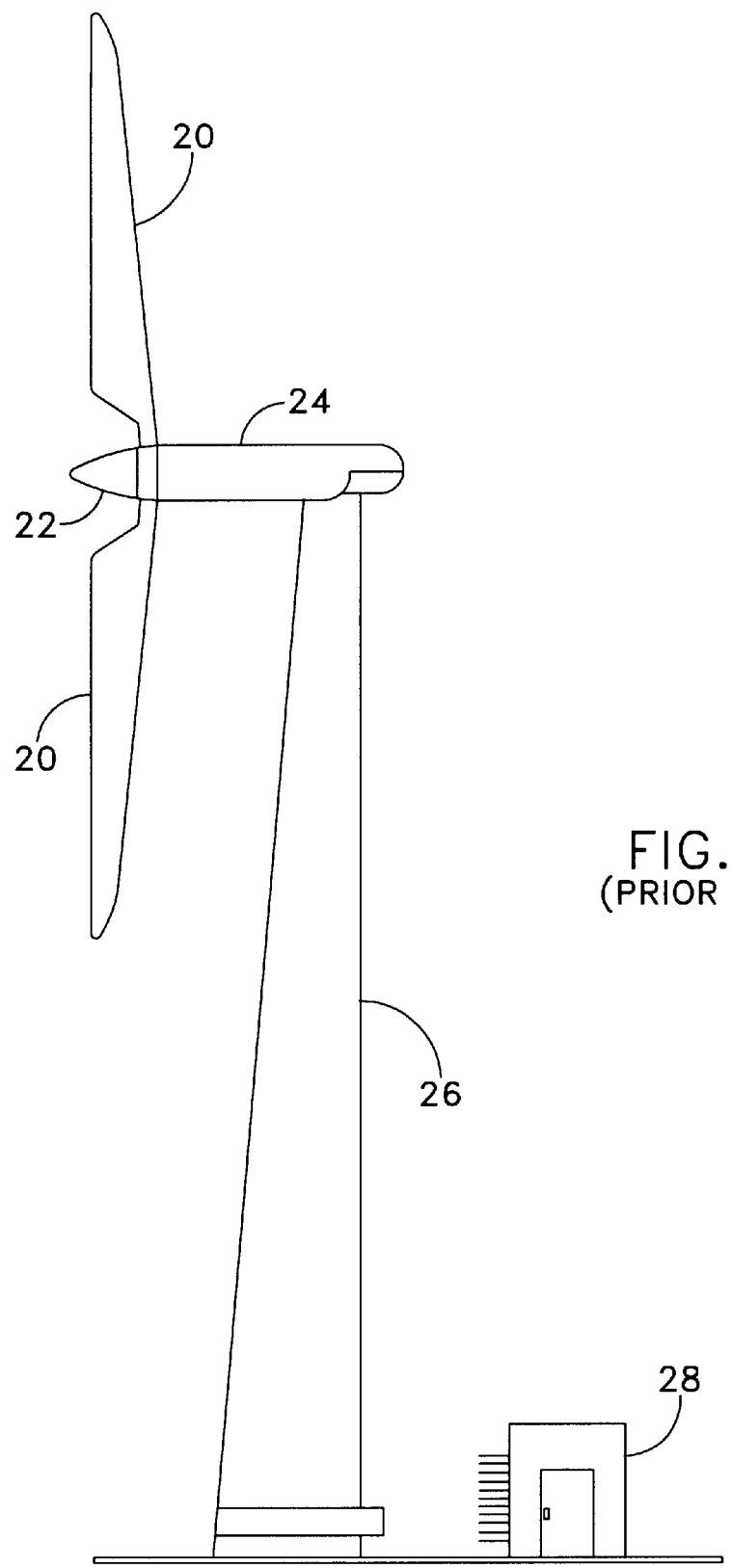
FIG. 1 is a side elevational view of a prior art wind turbine assembly.
Figure 2A:
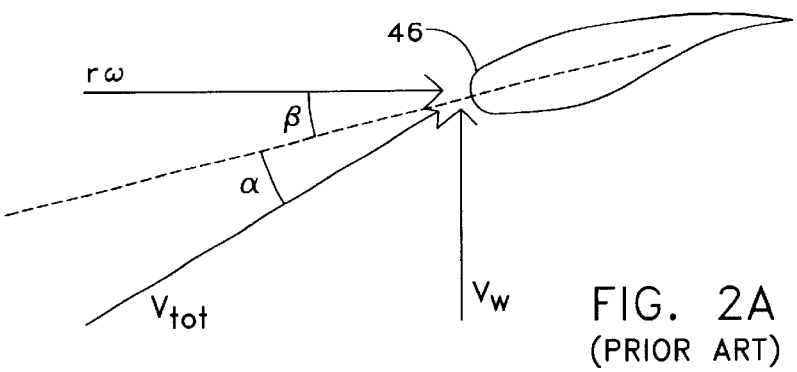
FIGS. 2A–2C are diagrammatic representations illustrating various factors involved in the interaction of wind and turbine blades.
Figure 2C:
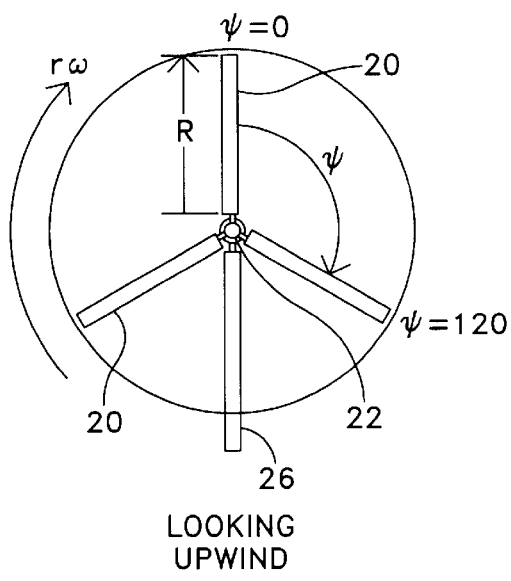
Figure 2B:
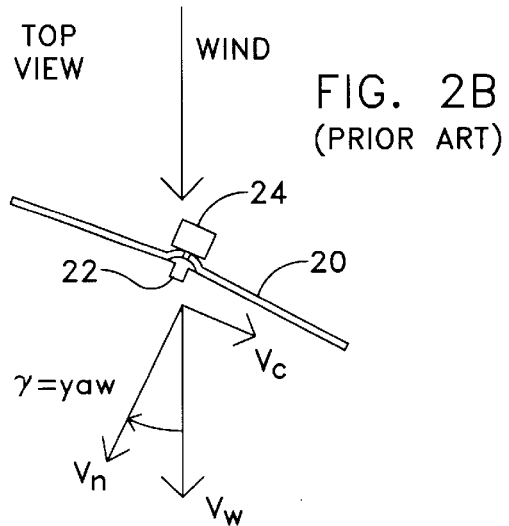
Figure 3:
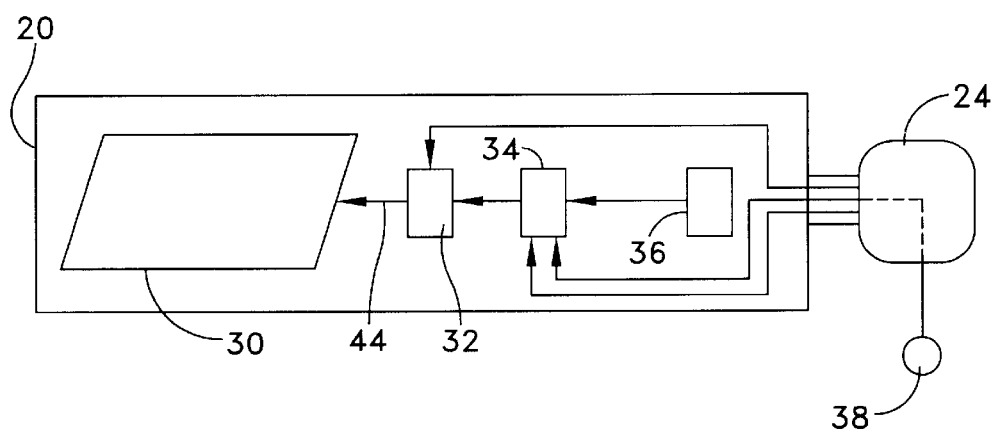
FIG. 3 is a schematic diagram of one form of turbine blade assembly illustrative of an embodiment of the invention.

Referring to FIG. 3, it will be seen that each of the blades 20 is provided with an embedded actuator 30 adapted to effect a reconfiguration of the blade, which is a flexible blade. The actuator 30 preferably is a piezo-electric fiber or a shape memory alloy (SMA) fiber actuator adapted to change the camber of the blade, as will be further discussed hereinbelow.

A blade actuator power regulator 32 regulates electrical power supplied to the actuator 30. A blade control computer 34 receives signals from sensors, such as a blade load sensor 36 disposed on the blade 20 and a wind speed sensor 38. The sensors 36 and 38, as well as additional sensors (not shown), measure current wind conditions and current configuration and speed of the blade. In response to the various signals received, the control computer 34 sends operational signals to the power regulator 32 which, in turn, sends reconfiguration instructions to the actuator 30. The power regulator 32 receives power from the generator 24.

Thus, data from the sensors 36, 38, and others, is directed to the control computer 34 which "reads" current conditions of the wind and current configuration of the blade 20 and sends corrective signals to the power regulator 32, which directs the correct amount of power to the acuator 30.

In operation, the assembly controls local blade angle of attack such that maximum power is output at low wind speeds and the blades are controlled to minimize dynamic loading at high wind speeds. The assembly herein described has been found useful, for example, in a typical 750 kW turbine. This particular turbine is a horizontal axis turbine with three blades in upstream operation. The blade radius is 22 m with a taper distribution such that a maximum chord length of 3 m results at a span location of three meters and the chord decreases approximately quadratically to 1 m at 22 m span location. Taper is generally used to provide, as much as possible, uniform loading over the turbine disk to extract a maximum amount of energy from the wind. Local angle of attack as a function of span is computed as described hereinbefore.

Assuming a baseline blade is designed with some initial twist and optimized for a selected wind speed, the control computer 34 determines the amount of additional twist required for an active control system. For a typical wind turbine, a majority of the forces and moments are produced from 50% span and outboard. This is due to the relatively slow rotational velocities inboard. For example, for two extreme cases in wind velocity (2 m/s and 30 m/s), the blade will need to twist an additional 10 degrees from 50% span to the tip. For a rotor radius of 22 m, this is approximately 1 degree per meter. If pitch control is minimal, the blade will be required to twist 3 degrees per meter. These numbers provide a rough indication of the amount of twist the system offers.

Preferably, the blades 20 are of a flexible "smart" composite material. The actuator 30 includes SMA wires 40, or sheets or embedded piezoelectric fibers. The piezoelectric or SMA elements 40 are configured at a nominal angle of 45 degrees (FIG. 4), such that when actuated they contract or expand in length and change the blade twist. Similarly, piezoelectric fibers are actuated by applying an electrical potential to them. The SMA elements 40 are actuated by passing electrical power through them to heat the elements to their critical temperature. The actuator wires 40 drive the twist. The elasticity of the blade material returns the blade to neutral position when electrical power is removed from the wires 40. Power for adjusting the twist is provided by the electric generator 24.

The blade load sensors 36 embedded in the wind turbine blades 20 preferably are piezoelectric fibers or any commercially available strain sensor. These sensors indicate twist of the blades by measuring the amount of deflection. Sensors may also be embedded in the hub 22 and generator 24 to indicate rotational speed. The voltage and current output from the generator 24 is measured to compute power produced by the generator 24. The wind speed sensor 38 is mounted on or near the wind turbine. All the data from the sensors (wind speed, rotational speed, generator voltage and current, and blade shape) is read into the control computer 34. The computer 34 is provided with a control algorithm that regulates the twist of the blade by sending commands to the blade power regulator 32. That is, an optimum blade twist is derived from a formula based on the wind speed, hub rotational speed, and generator power output. The computer algorithm adjusts the power command until blade twist sensors 36 indicate that the optimum blade shape has been obtained.

Additionally, sensors can be put into the blade 20 near the hub 22 to measure root flap bending moment. The blade twist is changed to dump load if the root flap moment exceeds a critical value at high wind speed. At low wind speed the root flap moment is used to optimize angle of attack and increase power.

All sensors can be commercially-off-the-shelf sensors.

Figure 4:
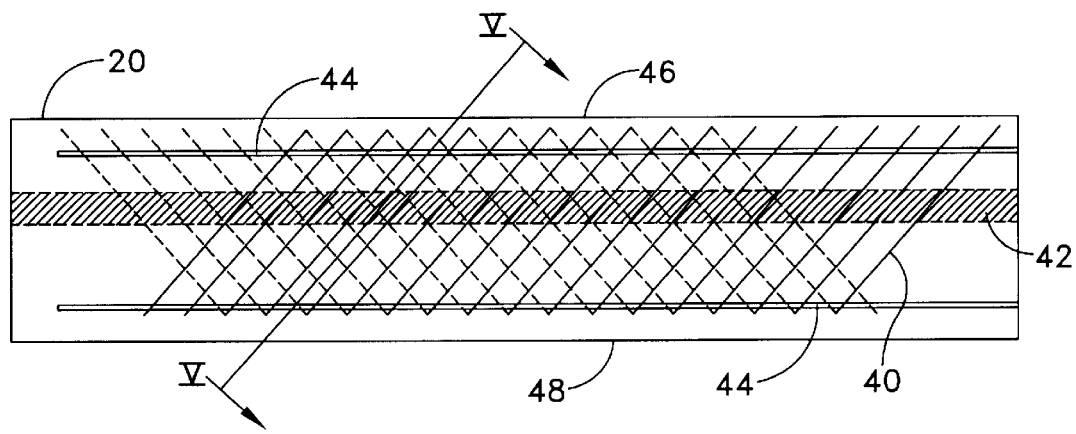
FIG. 4 is a diagrammatic plan view of a turbine blade assembly showing one embodiment of turbine blade suitable for the assembly.
Figure 5:
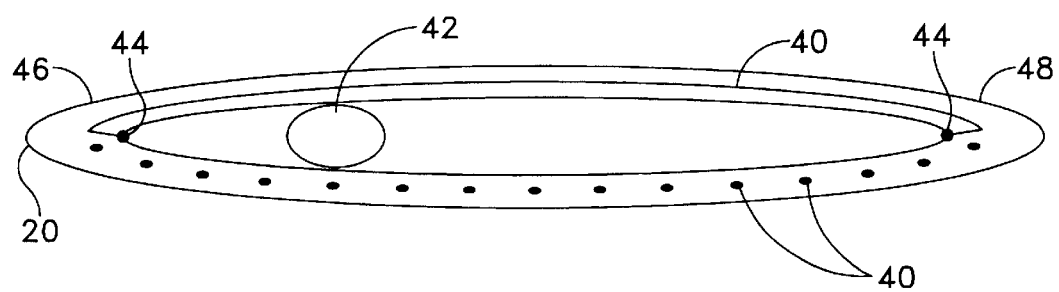
FIG. 5 is a diagrammatic sectional view, taken along line V—V of FIG. 4.

FIGS. 4 and 5 illustrate a blade construction. A main spar 42 runs the length of the blade 20 to support the blade. Power cables 44 are located in the leading edge 46 and trailing edge 48 of the blade. The SMA wires 40 are connected to the power cables 44. The SMA wires 40 are configured in a combination of series and parallel circuits to obtain the desired voltage and current in the wires. The wires 40 are configured such that when heated through a critical temperature, the wires contract and twist the wind turbine blade. The power is passed through a set of slip rings (not shown) in the blade hub 22.

FIGS. 4 and 5 show the blade 20 with a single set of SMA wires 40. In this case, when power is removed from the SMA wires, the wires cool. The elasticity of the composite blade 20 serves as a spring to stretch the SMA wire and return it to neutral twist position.

Figure 6:
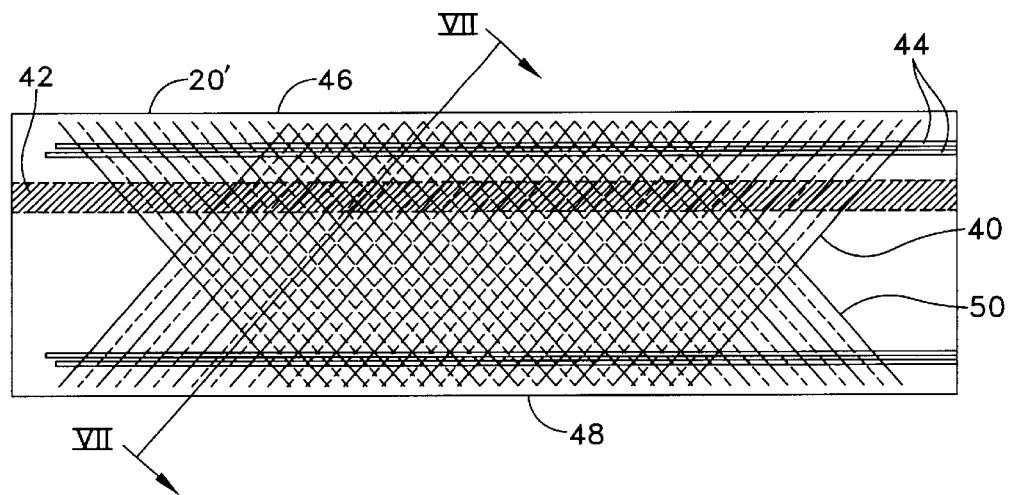
FIG. 6 is similar to FIG. 4, but showing an alternative embodiment of turbine blade.
Figure 7:
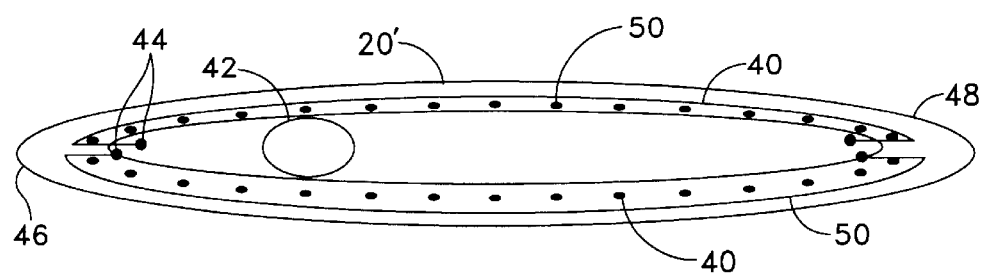
FIG. 7 is a diagrammatic sectional view, taken along line VII—VII of FIG. 6.

It may be desirable to install a second set of opposing wires 50 in the blade 20' as shown in FIGS. 6 and 7. These are powered to return the blade back to neutral twist position and beyond. The purpose of the second set of wires 50 is to allow twist in both direction for neutral position and to provide quicker response time. As noted above, piezoelectric fibers can be used instead of the SMA wires.

The basic concept is to have the wires 40 of the actuator 30 drive the twist. Then, the elasticity of the blade material returns the blade to neutral position when the electrical power is removed from the wires. An alternative is to install two sets of opposing actuator wires 40, 50, as shown in FIGS. 6 and 7. This allows the blade to be twisted both directions from the neutral position. Opposing actuator wires also provide a quicker response time on the return twist and compensate for histeresis in the flexible blade material.

There is thus provided an assembly which provides means for controlling the lift produced by wind turbine blades. The assembly further improves the efficiency of wind turbine systems by extending the range of wind speeds at which wind turbines can practically produce energy.

It will be understood that many additional changes in the details, materials, and arrangement of parts, which have been herein described and illustrated in order to explain the nature of the invention, may be made by those skilled in the art within the principles and scope of the invention as expressed in the appended claims. For example, the blade configuring assembly described herein can be applied to wind mills which produce electrical energy and to wind mills which provide direct mechanical energy, such as systems that drive water pumps. The assembly described herein has been applied to wind turbines, but can be applied to water turbines, and to optimizing lift on propeller blades for boats, aircraft, fans and liquid pumps.

What is claimed is:

1. A reconfigurable wind turbine blade assembly comprising:
    a plurality of blades mounted on a hub;
    an actuator including a first set of actuator wires embedded in each of said blades extending parallel to each other and at an angle transverse and of about 20°–70° configured diagonally to a lengthwise centerline of said blade with said actuator adapted to effect the reconfiguration of each of said blades by an actuated twisting action;
    an actuator power regulator joined to said actuator for regulating electrical power supplied to said actuator;
    a control computer joined to said actuator power regulator for sending commands to said actuator power regulator;
    a wind sensor joined to said control computer to measure current wind conditions and provide such to said control computer; and an electrical generator for supplying electrical power to the assembly.

2. The assembly in accordance with claim 1, and comprising further sensors adapted to determine current configurations and speed of said blades;

wherein data from said further sensors is fed to said control computer; and said control computer commands said actuator power regulator to energize said actuators to reconfigure said blades for optimum performance under current wind conditions.

3. The assembly in accordance with claim 1 wherein said actuator further comprises a second set of actuator wires embedded in each of said blades and extending in a direction opposite to said first set of actuator wires, said first and second sets of actuator wires adapted to twist said blades in respective opposite directions.

4. A reconfigurable wind turbine blade comprising:

a blade;

an actuator including a first set of actuator wires embedded in said blade with said first set of actuator wires extending parallel to each other and are configured diagonally at an angle transverse to a lengthwise centerline of said blade, said actuator adapted to receive electrical power to twist said blade;

an actuator power regulator joined to said actuator and adapted to initiate operation of said actuator to reconfigure said blade by said twisting action to obtain a selected configuration under current wind conditions;

a blade load sensor embedded in said blade and adapted to measure deflection of said blade, and thereby the configuration of said blade, and capable of providing a signal reporting the measured deflection;

a control computer for sending commands to said actuator power regulator, and continuously adjusting the commands in response to the signals received indicative of the configuration of said blade;

a wind speed sensor disposed proximate the blade, and adapted to measure wind speed and to report to said control computer; and an electrical power source, joined to supply electrical power to said control computer and to said actuator power regulator.

5. The assembly in accordance with claim 4 wherein said actuator further comprises a second set of actuator wires embedded in said blade and extending in a direction opposite to said first set of actuator wires, said first and second sets of actuator wires being adapted to twist said blade in respective opposite directions.

* * * * *